United States Patent [19]

Ogasawara

[11] 4,335,341

[45] Jun. 15, 1982

[54] AUTOMATIC CONTROL METHOD AND APPARATUS

[75] Inventor: Hitoshi Ogasawara, Hitachi, Japan

[73] Assignee: Hitachi, Ltd., Tokyo, Japan

[21] Appl. No.: 166,703

[22] Filed: Jul. 3, 1980

[30] Foreign Application Priority Data

Jul. 6, 1979 [JP] Japan .................................. 54/85005

[51] Int. Cl.³ .............................................. G05B 5/01
[52] U.S. Cl. .................................... 318/624; 318/611
[58] Field of Search ............... 318/611, 624, 619, 286, 318/631, 630, 283, 285, 484

[56] References Cited

U.S. PATENT DOCUMENTS

| | | | |
|---|---|---|---|
| 3,441,818 | 4/1969 | Tiskus et al. ........................ | 318/624 |
| 4,112,342 | 9/1978 | Elliott ............................. | 318/624 X |
| 4,282,469 | 8/1981 | Moriyama ........................... | 318/619 |
| 4,300,080 | 11/1980 | Lee ................................. | 318/624 X |

Primary Examiner—B. Dobeck
Attorney, Agent, or Firm—Craig & Antonelli

[57] ABSTRACT

An automatic control system in which a controlled quantity of an object to be controlled is compared with a preset quantity through a comparator, the output signal of which is applied to blind controller means having a dead zone set therein. When the output from the comparator comes out beyond the dead zone, the blind controller means cooperates with operation holding means to perform a control operation continuously for a predetermined time even when the output from the comparator falls within the dead zone. The number of times at which the object is controlled may be significantly decreased.

6 Claims, 6 Drawing Figures

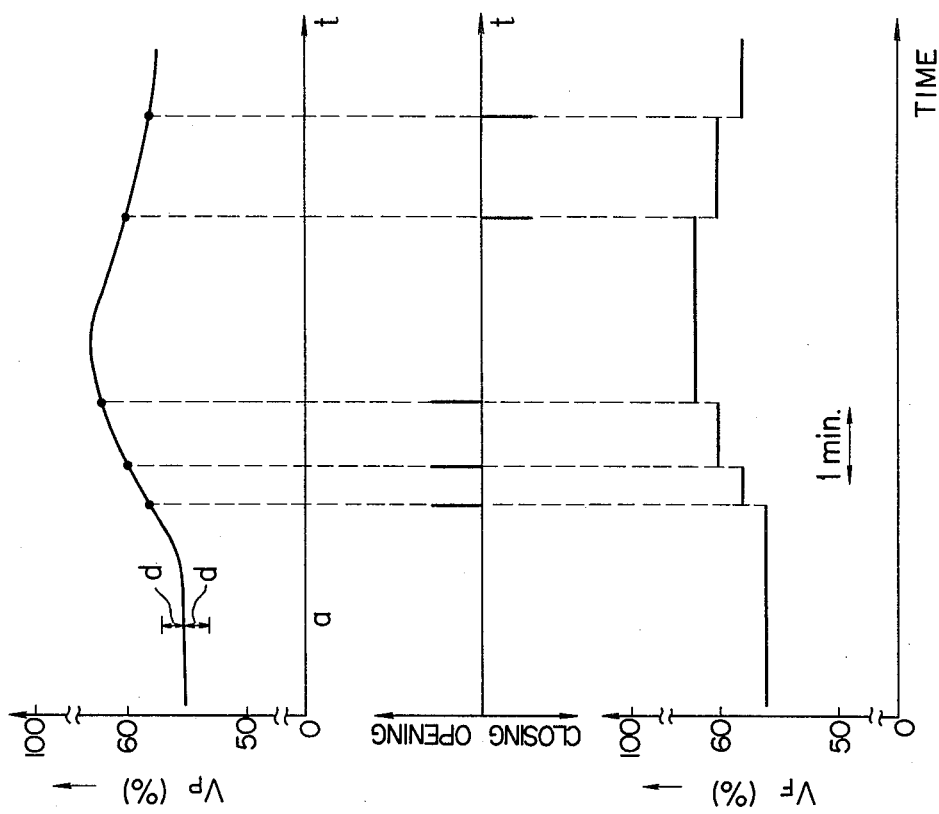
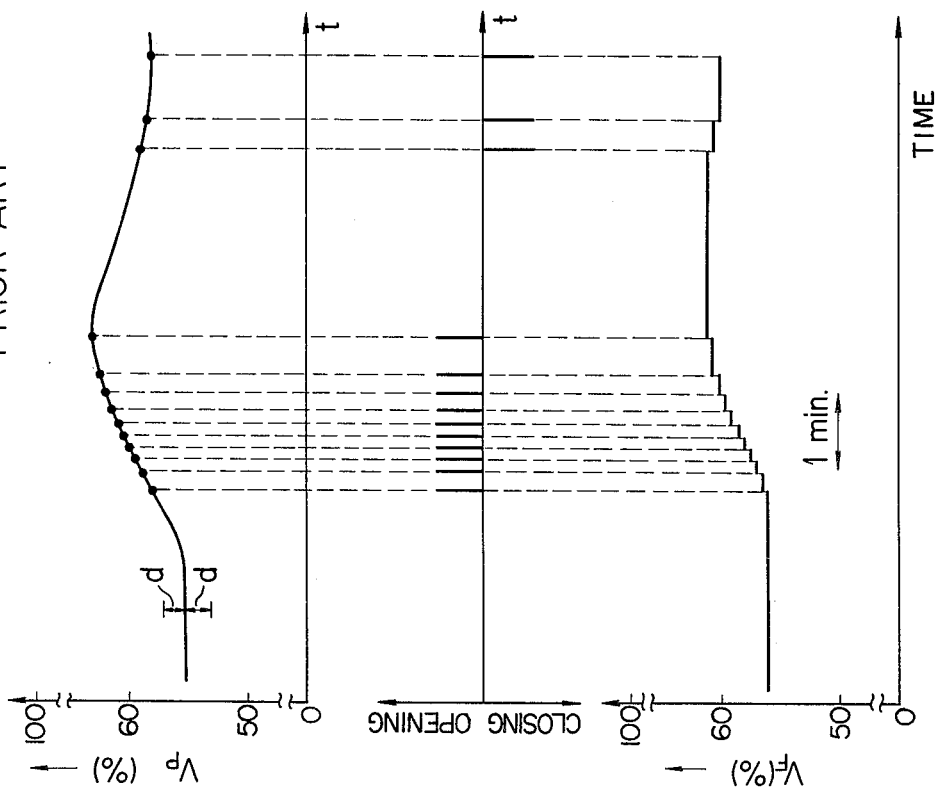

AUTOMATIC CONTROL METHOD AND APPARATUS

BACKGROUND OF THE INVENTION

1. Field of the Invention

The present invention relates to an automatic control method and apparatus for controlling an object to be controlled in a closed loop.

2. Description of the Prior Art

It is well known that, in general, a closed loop control is employed for controlling automatically an object to be controlled such as an electrically driven valve or the like. According to common practice, a dead zone is usually provided in the automatically controlling system which includes movable parts such as gears and a drive motor, so as to prevent the control operation from taking place at a higher frequency. In this case, only when the deviation or error between a desired quantity and an actually controlled quantity of an object to be controlled comes out beyond the dead zone, the control operation is performed, whereby the frequency of the control operation can be decreased.

According to the hitherto known control system, however, the control operation is stopped immediately after the controlled quantity falls within the dead zone. Consequently, in the situation where the desired quantity undergoes variations, a correspondingly increased number of control operations will take place. Therefore, the provision of the dead zone which is inherently intended for preventing the frequent control operations will not always bring about the intended action in a satisfactory manner. An attempt to overcome such disadvantage is disclosed in Japanese Patent Publication No. 15607/1966 entitled "Automatic control apparatus". According to this prior art reference, control is made such that when the controlled quantity comes out beyond the dead zone, the size or range of the dead zone is reduced substantially to zero to thereby cause the controlled quantity to coincide with the desired quantity.

However, the control method disclosed in the above-mentioned prisn art reference is disadvantageous in that the size or range of the dead zone has to be altered every time the actually controlled quantity comes out beyond the dead zone. For altering the size or range of the dead zone, there is conceivable an arrangement for adjusting the dead zone setting elements which constitute the dead zone circuit. Alternatively, a pair of the dead zone circuits are provided and interconnected so as to be mutually exchangeable. However, both of these solutions involve a complicated circuit arrangement with a rather degraded reliability in attaining the intended control.

SUMMARY OF THE INVENTION

An object of the invention is to provide an automatic control method and apparatus which allow the frequency of control operations to be decreased with a simplified arrangement, without degrading the reliability in the control performance.

According to a feature of the invention, when a controlled quantity of an object to be controlled comes out beyond the dead zone, control operation is continuously performed for a predetermined time even if the controlled quantity falls within the dead zone again.

According to another feature of the invention, the predetermined time during which the control operation is continuously effected is determined in dependence on the size or width of the dead zone and the operating speed of the object to be controlled.

Other objects and features of the invention will be apparent in the following description.

BRIEF DESCRIPTION OF THE DRAWINGS

In the accompanying drawings:

FIGS. 3 and 4 graphically illustrate experimentally obtained control characteristics for a conventional and an inventive control system, respectively;

DETAILED DESCRIPTION OF THE PREFERRED EMBODIMENTS

Figure 1:
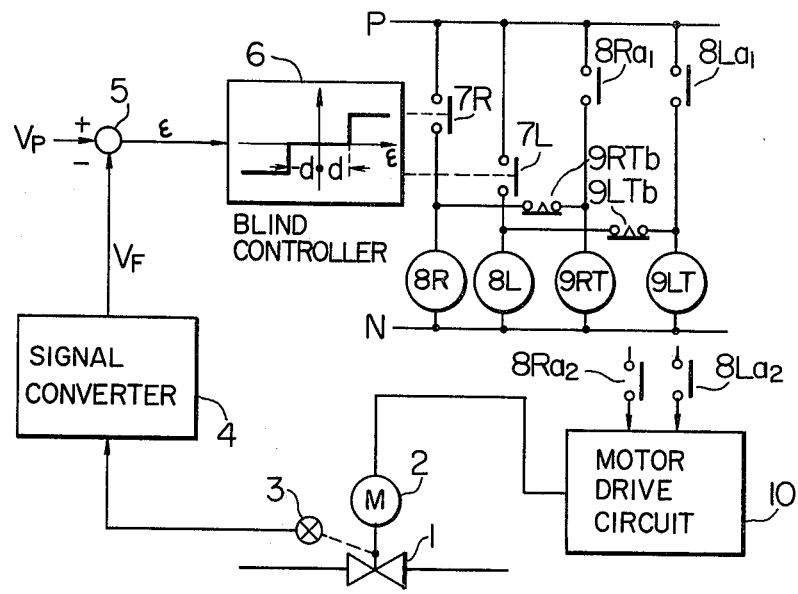
FIG. 1 shows an arrangement of an emodiment of the invention.

FIG. 1 shows an automatic control apparatus for controllably adjusting the opening degree of an electrically driven valve to which the principle of the invention is applied.

Referring to FIG. 1, the electrically driven valve 1 is operated by an electric motor 2 so as to be driven selectively in the opening or closing direction thereby to control a flow rate therethrough. Usually, the valve 1 and the driving motor 2 are mechanically coupled to each other through a reduction gear train, although such coupling arrangement is omitted from illustration. The actual opening degree of the valve 1 is detected by a potentiometer 3, the output signal of which is supplied to a comparator 5 through a signal converter 4. At the comparator 5, a signal representing the actual opening degree (controlled quantity) $V_F$ of the valve 1 derived from the signal converter 4 is compared with the value of a desired opening degree (set quantity) $V_P$ with respective polarities as illustrated, whereby a resultant deviation or error $\epsilon$ is produced from the comparator 5. The error signal $\epsilon$ is then applied to a blind controller 6 in which a dead zone having a width of 2d with the desired quantity $V_P$ as its central value. Namely the dead zone ranges between its upper and lower limit values $\pm d$. When $\epsilon > d$, an opening command contact 7R is closed and on the other hand, when $\epsilon < -d$, (i.e. when $\epsilon < 0$ and $|\epsilon| > |d|$), a closing command contact 7L is closed. The opening command contact 7R is connected in series to an opening operation command relay 8R between DC power supply buses P and N, while the closing command contact 7L is connected in series to a closing operation command relay 8L between the buses P and N. Further connected between these buses P and N are a series circuit of a normally opened contact 8Ra1 of the opening operation command relay 8R and a timing relay 9RT (timed-operation-instantaneous-reset-type) and a series connection of a normally opened contact 8La1 of the closing operation command relay 8L and a timing relay 9LT (timed-operation-instantaneous-reset type). The timing relays 9RT and 9LT have normally closed contacts 9RTb and 9LTb respectively. Reference numeral 10 denotes a motor driving circuit which is adapted to drive the control motor 2 in the forward or backward direction in dependence on whether a normally opened contact 8Ra2 of the relay 8R or a normally opened contact 8La2 of the relay 8L is closed, respectively.

Figure 2:
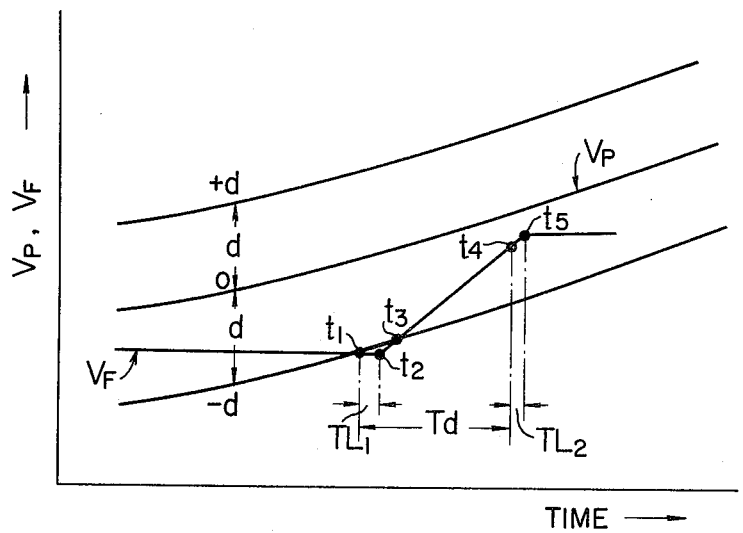
FIG. 2 graphically illustrates control characteristics of an automatic control system according to the invention.

Now, operation of the automatic valve control system shown in FIG. 1 will be described by referring to FIG. 2. As briefly described above, the deviation or error $\epsilon$ between the desired valve opening degree $V_P$ and the actual valve opening degree $V_F$ is obtained from the output of the comparator 5 and supplied to the blind controller 6 in which the error $\epsilon$ is compared with the upper and lower limit values $\pm d$ of the dead zone. When $\epsilon > d$, the opening command contact 7R is closed, while when $\epsilon < -d$ (i.e. $\epsilon < 0$ and $|\epsilon| > |d|$), the closing command contact 7L is closed. This means that in the case where $|d| \geq |\epsilon|$, neither the contact 7R nor 7L is closed, and therefore neither the relay 8R nor 8L will be operated. In other words, so far as the actual valve opening degree $V_F$ lies in the range $\pm d$ of the dead zone, the instant opening degree of the valve 1 is maintained as it is.

Assuming now that the desired opening valve degree (set value) $V_P$ is varied (for example increased) until $-d > 68$ at a time $t_1$, the blind controller 6 is operative to close the valve opening command contact 7R. In response to the closing of the contact 7R, the opening operation command relay 8R is energized to close the contacts 8Ra1 and 8Ra2. At the same time, the timer relay 9RT is energized due to the closing of the contact 8Ra1. In response to the closing of the contact 8Ra2 the motor driving circuit 10 actuates the electric motor 2 to rotate in the forward direction to thereby drive the valve 1 in the opening direction. In this manner, the opening operation of the valve 1 is initiated at a time $t_2$ with a time delay $TL_1$ from the time $t_1$ which delay is ascribable to mechanical factors. When the opening degree $V_F$ of the valve 1 falls within the dead zone at a time $t_3$, the valve opening command contact 7R is opened. However, since the opening operation command relay 8R continues to be energized through the contacts 8Ra1 and 9RTb, the opening operation of the valve 1 is continuously effected. Upon the lapse of a limit time Td set by the timer relay 9RT from the time point $t_1$, the timer relay 9RT actuates operated to open the normally closed contact 9RTb at a time $t_4$.

The limit time Td set by each of the timer relays 9RT and 9LT is determined from the following expression:

$$Td = (d/v) \qquad (1)$$

where d represents the value of each of the upper and lower width of the dead zone (% with respect to fully opened state) and v represents the valve opening or closing rate (%/sec). Upon the opening of the normally closed contact 9RTb, the opening operation command relay 8R is deenergized to open its contacts 8Ra1 and 8Ra2. The opening of the contact 8Ra2 results in that the drive circuit 10 stops the forward rotation of the electric motor 2 at a time $t_4$. The opening degree of the valve 1 is then stabilized in the dead zone at a time point $t_5$ with a time delay $TL_2$ due to mechanical factors. It should be noted that, when the time limit is set in accordance with the expression (1), the degree of control operation performed within the time limit corresponds to the value d of each of the upper and lower widths of the dead zone.

On the other hand, when the actual opening degree $V_F$ of the valve 1 exceeds the desired opening degree $V_P$ by more than the upper width d of the dead zone, i.e. when $\epsilon > d$, the valve closing command contact 7L is closed. In this case, the relay 8L is energized for the limited time Td set by the timer relay 9LT. As the consequence, the drive circuit 10 drives the motor 2 in the backward or reverse direction to cause the valve 1 to be operated in the closing direction. Of course, the valve closing operation is effected only for the limited time Td.

In this manner, when the actual opening degree $V_F$ of the valve 1 varies to come out beyond the range of the dead zone set at the blind controller 6, the valve opening or closing operation is allowed to take place for the predetermined time duration set by the associated time limit relay. By virtue of this feature, the number of times at which the control operations are effected can be significantly reduced for the same rate of change of the desired opening degree according to the invention, when compared with the hitherto known control system in which the control operation is immediately stopped as soon as the opening degree of the valve falls within the blind zone.

FIGS. 3 and 4 illustrate performance characteristics depicted on the basis of experimentally obtained data under the conditions that the valve opening or closing operation to the fully closed or opened state (100%) is effected for a time in the range of 1.5 to 3 minutes (i.e. at a rate of 0.6 to 1.1%/sec) and that the value d of each of the upper and lower width of the dead zone is selected equal to 2% of the fully opened throat area of the valve. In FIG. 3, the performance characteristic of the conventional control system according to which the control operation is immediately stopped as soon as the opening degree of the valve falls within the dead zone, while FIG. 4 illustrates the performance characteristics of the control system according to the invention. As can be seen from these characteristic graphs, the number of times for the valve opening or closing operations can be significantly reduced in the case of the control system according to the invention for a same variation in the desired opening degree $V_P$ as compared with the hitherto known control system.

The embodiment of the valve control system described above is implemented through analog technique. However, it is possible to accomplish the intended control through digital technique.

Figure 5:
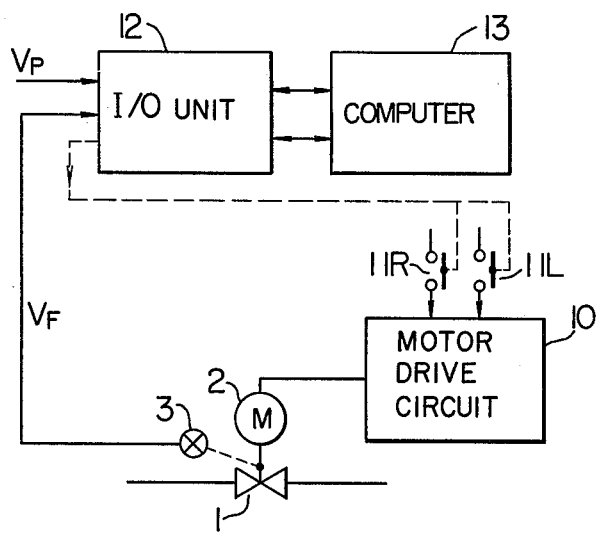
FIG. 5 shows an arrangement of another embodiment of the invention.

FIG. 5 shows an exemplary embodiment of a digital control system according to the invention. In this figure, the like parts or elements as those shown in FIG. 1 are denoted by the same reference symbols. As can be seen from FIG. 5, there is provided a computer 13 into which the desired valve opening degree $V_P$ and the actual opening degree $V_F$ are loaded through an input/output unit 12. The results of arithmetic operations executed by the computer 13 are output through the input/output unit 12 so as to close either the valve opening command contact 11R or the valve closing command contact 11L.

Figure 6:
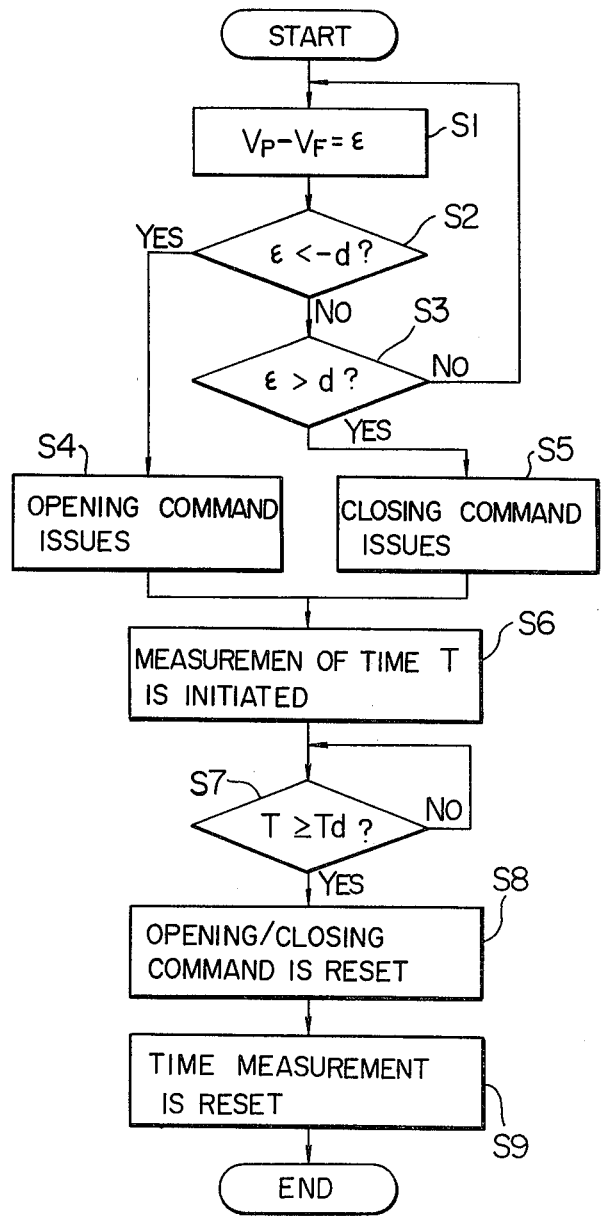
FIG. 6 shows a flow chart to illustrate operations of the automatic control system shown in FIG. 5.

Next, operation of the digital valve control system shown in FIG. 5 will be described by referring to a flow chart shown in FIG. 6. At a step S1, the computer 13 arithmetically determines the deviation or error between the desired valve opening degree $V_P$ and the actual valve opening degree $V_P$. At a step S2, it is decided whether $\epsilon < -d$. When the comparison results in that $\epsilon \geq -d$, then a next step S3 is executed to ascertain whether $\epsilon > d$. If the decision at the step S3 is such that $d \geq \epsilon$, this means that the actual valve opening degree $V_F$ lies within the range of the dead zone. Then the step S1 is regained. When the actual valve opening degree $V_F$ is reduced below the desired opening degree $V_P$ to come out beyond the lower limit value $-d$ of the dead zone, it is decided at the step S2 that $\epsilon < -d$, and the program proceeds to a step S4 where the valve opening command is issued through the input/output unit 12 to thereby close the valve opening command contact 11R. In response to the closing of the valve opening command contact 11R, the motor drive circuit 10 causes the electric motor 2 to rotate in the forward direction to thereby drive the valve 1 in the opening direction. On the other hand, upon issue of the opening command at the step S4, the time T for driving the valve 1 is measured at a step S6 which is followed by a step S7 where decision is made as to whether $T \geq Td$. If $Td > T$, the time comparison continues to be executed at the step S7. When the condition $T \geq Td$ becomes unsatisfied, a step S8 is executed to reset the valve opening command. Then, the valve opening command contact 11R is opened, whereby the drive circuit 10 stops the opening operation of the valve 1. Upon disappearance of the valve opening command at the step S8, the measurement of the valve driving time T is reset at a step S9.

On the other hand, when the actual valve opening degree $V_F$ increases beyond the desired opening degree $V_P$ to come out beyond the upper limit value $-d$ of the dead zone, it is decided at the step S3 that $\epsilon > d$ and the valve closing command is issued at the step S5. Consequently, the valve closing command contact 11L is closed, whereby the drive circuit 10 causes the valve 1 to be operated in the closing direction through the motor 3. This valve closing operation is effected for a predetermined time duration Td as in the case of the valve opening operation.

It will now be appreciated that the invention can be implemented either in an analog or digital type control system.

As will be understood from the foregoing description, the invention has now provided a control system which triggers a control operation for a predetermined time duration when a controlled value (e.g. an actual opening degree of a valve) of an object to be controlled exceeds a predetermined dead zone and maintains the control operation even when the control quantity falls again within the dead zone unless the predetermined time has elapsed. The control system according to the invention can be implemented in a simplified structure and operated in a much facilitated manner merely by setting the time for performing the control operation with a high fidelity with the frequency of the control operations being significantly decreased.

Although the foregoing description has been made on the assumption that the invention is applied to the control for the electrically driven valve, it will be appreciated that the invention will never be restricted to such application. It goes without saying that the invention can be applied to numerous automatic control systems for controlling various objects such as water gate or the like in a closed loop.

I claim:

1. An automatic control apparatus for controlling an object to be controlled in a closed control loop, comprising comparing means for comparing a controlled quantity of said object with a set quantity, blind controller means to which the output from said comparing means is supplied and which has a dead zone, and operation holding means for allowing control operation of said object to be carried out continuously for a predetermined time when the output from said comparing means comes out beyond said dead zone, said control operation being continued even after the output from said comparing means falls again within said dead zone unless said predetermined time has elapsed.

2. An automatic control apparatus as set forth in claim 1, wherein said operation holding means is adapted to determine said predetermined time in dependence on the magnitude of the range of said dead zone and the operating speed of said object to be controlled.

3. An automatic control apparatus for controlling an object to be controlled in a closed control loop, comprising comparing means for comparing a controlled quantity with a set quantity, blind control means for producing an output signal only during a period in which the output from said comparing means comes out beyond a dead zone set in said blind control means, command contact means adapted to be closed in response to the output from said blind control means, operation command relay means adapted to be actuated in response to the closing of said command contact means, driving means for driving said object to be controlled so long as said operation command relay means is actuated, and operation holding means for holding said operation command relay in the actuated state for a predetermined period of time even when said command contact means is switched to its open state from its closed state.

4. An automatic control apparatus as set forth in claim 3, wherein said operation holding means includes timing relay means which is adapted to be actuated for said predetermined period of time even when said command contact means is switched from its closed state to its open state.

5. An automatic control method for controlling an object to be controlled in a closed control loop in accordance with a set quantity and a controlled quantity of said object, comprising the step of, when said controlled quantity exceeds said set quantity to come out beyond a dead zone, continuously performing a control operation of said object for a predetermined time even when control quantity falls again within said dead zone.

6. A method of controlling automatically an object, comprising steps of comparing a set quantity and a controlled quantity of said object with each other to produce a control error therebetween, deciding whether said control error comes out beyond a dead zone, driving said object when said control error comes out beyond said dead zone, measuring a time duration in which said object is driven, comparing said measured driving time duration with a predetermined time, and stopping the driving operation for said object when said measured time duration has reached said predetermined time.

* * * * *